F. Peabody,
Hay Spreader.
No. 12,728.
Patented April 17, 1855.
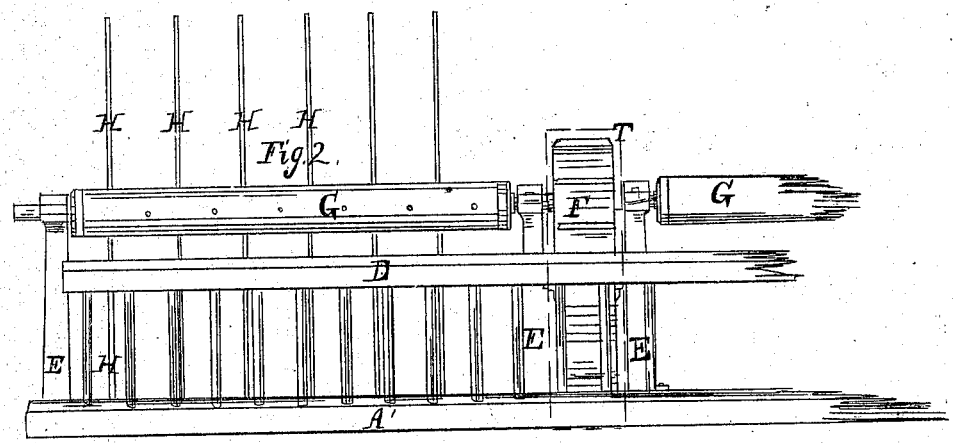
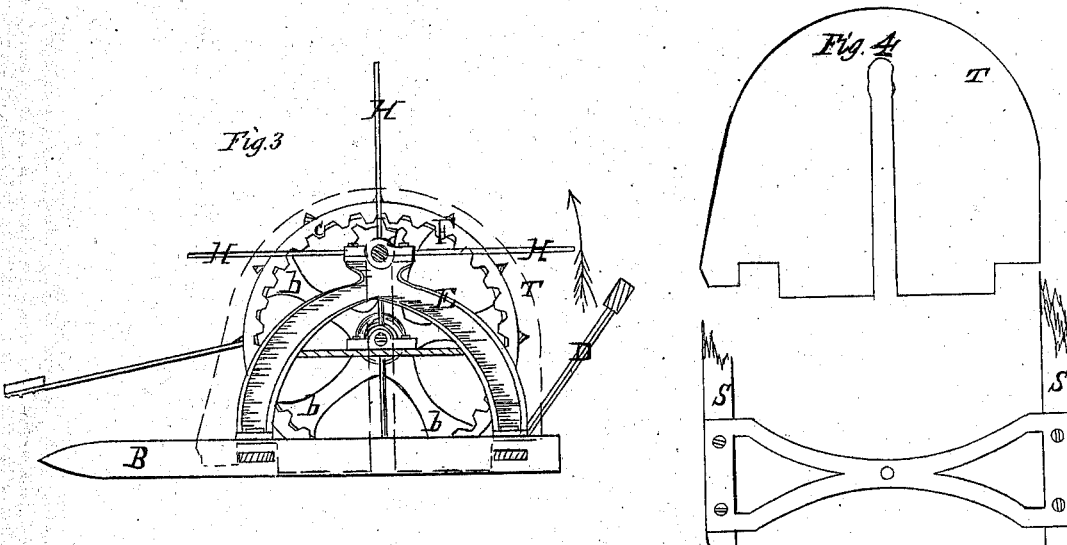
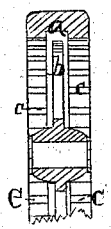
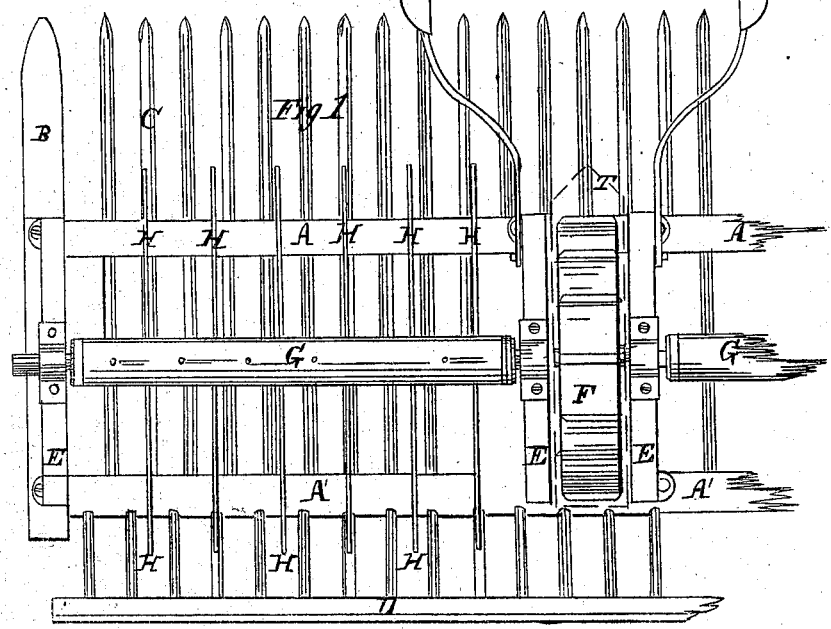

UNITED STATES PATENT OFFICE.

FRANCIS PEABODY, OF SALEM, MASSACHUSETTS.

HAY-MAKING MACHINE.

Specification forming part of Letters Patent No. 12,728, dated April 17, 1855.

*To all whom it may concern:*

Be it known that I, FRANCIS PEABODY, of Salem, in the county of Essex and State of Massachusetts, have invented a new and useful Machine for the Purpose of Drying Grass and Making Hay, of which the following is a full, clear, and exact description, reference being had to the annexed drawings, making part of this specification, in which—

Figure 1 is a plan; Fig. 2, a rear elevation; Fig. 3, an end view; Fig. 4, a removable case, which serves to cover the driving-wheel and the parts immediately connected therewith, and prevent them from being clogged by the grass. Fig. 5 is a section of the interior of the driving-wheel, showing the cogs which actuate the revolving arms or scatterers.

No part of the process of making hay consumes labor to a greater disadvantage than the turning and scattering the grass over the field to expose it to the action of the sun and air, and nothing is more essential to its preservation than complete desiccation. In the machines heretofore used for this purpose the arms or beaters which raise the grass revolve in the direction in which the machine progresses, and thus the grass is thrown in advance of the machine and falls upon the horse and driver, and also accumulates in front of the machine itself, which is thus impeded in the performance of its work.

To remove these defects, and to produce a machine that shall operate equally upon all the mown grass and throw it to the rear of the machine instead of in advance of it, is the object of my present invention; and my invention consists in gathering up the grass upon the fingers or teeth of a horizontal rake, upon which it is submitted to the action of rapidly-revolving arms, by which it is thrown into the air in a direction contrary to that in which the machine moves, the fingers of the rake being bent up in the rear at a suitable angle to guide the grass upward as it is thrown off by the revolving arms.

To enable others to construct and use my machine, I will proceed to describe its construction and operation.

In the accompanying drawings, A A' is the frame-work of the horizontal rake, the end pieces, B, of which form runners, which slide upon the ground and guide the rake in its progress over the surface.

C are the fingers of the rake, which gather up the mown grass and present it to the revolving arms or scatterers.

D is the back frame, which rises at a suitable angle from the rear bar, A', of the rake, and which serves to guide the grass upward as it is carried round by the revolving arms.

E are arched standards, which rise from the frame-work of the rake, and on which run the gudgeons of the driving-wheel F and the revolving scatterers.

The driving-wheel consists of a broad rim, $a$, Fig. 5, supported upon the spokes $b$, upon each side of which are the cogs $c$, which engage with the teeth of the wheels $d$ upon the arbors G of the scatterers H. The latter project from their arbors, and are thus made to revolve rapidly as the machine advances, and to seize the grass which is collected by the rake and throw it into the air, whence it falls evenly and lightly over the surface of the ground. Owing to the fact that the wheels $d$ engage with the interior of the rim of the driving-wheel F, the arms H are caused to revolve in a direction contrary to that in which the machine advances, as indicated by the arrow in Fig. 3. The grass will thus fall behind and not in advance of the machine, as has heretofore been the case.

In the accompanying drawings but one-half of the machine is represented, the driving-wheel F being placed in the center of its length. The whole machine is thus turned upon this wheel as upon a pivot, and it may in consequence be made to operate in corners of the field or near to fences, where it would be impossible to use a machine with the driving-wheels upon its outside ends.

Some of the advantages which the above machine possesses over those heretofore constructed may be enumerated as follows:

First, the grass, in lieu of being thrown in front of the machine, by which its operation would be clogged and the horse and driver incommoded, is all thrown behind it, where it falls lightly and is evenly distributed over the ground, not being again tramped upon or pressed into the ground by the team or the wheels of the machine.

Secondly, owing to the peculiar manner in which it is balanced upon each side of the single driving-wheel, the machine is easily turned in any direction, and may be operated in positions where it could otherwise not be introduced, as before explained.

Thirdly, either end of the rake will be tilted up by any obstructions which it may encounter, and the fingers will thus be preserved from breaking, while at the same time they are allowed to run close to the surface of the ground.

In Fig. 4 is seen the cover or case T, which serves to protect the gearing from being clogged by the grass. The position of this cover is indicated by the red lines in Figs. 1, 2, and 3. The machine is set in motion by a horse harnessed to the shafts S.

What I claim as my invention, and desire to secure by Letters Patent, is—

1. The within-described machine for making hay, consisting essentially of the rake for gathering the grass, in combination with the revolving scatterer, constructed and operating in the manner substantially as herein described.

2. Revolving the scatterer in a direction contrary to that in which the machine moves, for the purpose herein set forth.

3. The employment of a single wheel to carry and actuate the hay-maker when this wheel is placed in the center of the machine, in the manner and for the purpose set forth.

FRANCIS PEABODY.

Witnesses:
SAM COOPER,
JOHN S. CLOW.